(12) United States Patent  (10) Patent No.: US 9,119,210 B2
Williams  (45) Date of Patent: Aug. 25, 2015

(54) CALCULATED GRAPHICAL FREQUENCY COVERAGES BASED ON AIRCRAFT POSITION

(71) Applicant: The Boeing Company, Chicago, IL (US)

(72) Inventor: Jeffrey L. Williams, Parker, CO (US)

(73) Assignee: The Boeing Company, Chicago, IL (US)

(*) Notice: Subject to any disclaimer, the term of this patent is extended or adjusted under 35 U.S.C. 154(b) by 200 days.

(21) Appl. No.: 13/857,425

(22) Filed: Apr. 5, 2013

(65) Prior Publication Data

US 2014/0302881 A1  Oct. 9, 2014

(51) Int. Cl.
H04B 7/00 (2006.01)
H04W 72/04 (2009.01)
H04B 7/185 (2006.01)
H04W 84/06 (2009.01)

(52) U.S. Cl.
CPC ......... *H04W 72/048* (2013.01); *H04B 7/18506* (2013.01); *H04W 84/06* (2013.01)

(58) Field of Classification Search
CPC .................................................. H04W 72/048
USPC .......................... 455/509, 431, 456, 434, 432
See application file for complete search history.

(56) References Cited

U.S. PATENT DOCUMENTS 6,282,417 B1 * 8/2001 Ward ............................ 455/431
2011/0292907 A1 * 12/2011 Tieftrunk et al. ............. 370/331

* cited by examiner

*Primary Examiner* — Sanh Phu
(74) *Attorney, Agent, or Firm* — Patterson & Sheridan, LLP

(57) ABSTRACT

Concepts described herein may provide available RCO information that may be used when moving from one RCO to another RCO. Range rings for the available RCOs may be calculated and adjusted based on current flight conditions. The range rings may be prioritized to provide a prioritized list of available RCOs.

19 Claims, 4 Drawing Sheets

CALCULATED GRAPHICAL FREQUENCY COVERAGES BASED ON AIRCRAFT POSITION

BACKGROUND

To assist in navigation, pilots are typically in contact with a facility responsible for aircraft within a defined area, such as an Air Route Traffic Control Center (ARTCC). Pilots use communications with a particular ARTCC to receive traffic information of other aircraft in their proximity to maintain proper spacing. Pilots often use this information to determine specific traffic conditions they may face or to formulate possible actions if the need arises. The ARTCC may also send other information such as emergency alerts or safety alerts. For example, the ARTCC may send to the pilot an alert that the aircraft is flying at an unsafe altitude relative to the aircraft's current position, heading or speed. The ARTCC may also send instructions to avoid possible safety issues or to correct safety issues the pilot may be experiencing. Additionally, the ARTCC may send vectors for navigational assistance or to help maintain separation of aircraft.

When moving between areas assigned to different ARTCCs, air traffic control (ATC) may instruct the pilot to switch frequencies to communication with another ATC, called a "handoff." During the handoff, the pilot will manually switch the communication system from the current communication frequency to the new communication frequency. When transmitting and receiving at the new communication frequency, the pilot will typically check in with the new ATC on the new communication frequency by providing the aircraft information and altitude. The ATC on the new communication frequency acknowledges the pilot, letting the pilot know that the ATC has audio communication with the aircraft.

Because of the distance between ATCs in some flight paths, a system of remote communication outlets (RCOs) may be implemented. An RCO is an unmanned VHF/UHF transmitter/receiver radio relay facility that expands the ARTCC air/ground communications coverage. The RCO will relay a call from a pilot to an ATC, or the reverse, so that it appears to the pilot that the pilot is in direct communication with the ATC. Typically, pilots find RCO frequencies in charts or publications such as the Airport/Facility Directory. Each RCO typically transmits and receives on a specific communication frequency, and some have more than one communication frequency. The maps provided in these types of publications are usually general in nature and do not provide specific details regarding the terrain. For example, in some situations there is no information regarding communication sectorization.

In use, a pilot may transfer communications between ATCs and RCOs via a series of handoffs as previously described. In some instances, the handoff may not be accomplished if the RCO is not within range of the aircraft radio, the RCO is not operational, or the RCO communication frequency is not being monitored. In some situations, the pilot may miss the handoff altogether. If the pilot senses that a handoff did not occur, the pilot may rotate through available frequencies. In some examples, the pilot can communicate with other aircraft in the area if in communication with those aircraft and request a communication frequency that is being monitored. Sometimes, the handoff may have occurred correctly but the pilot may be under a false impression that it did not happen. For example, the distances between RCOs may be vast in some areas, and the ATC in that area may be monitoring a significant number of RCOs. In that instance, the pilot may be in communication with the ATC but not realize it because of the time it takes for the ATC to respond to the pilot's identification communication.

Conventionally, the pilot or flight crew selects the RCO and the RCO communication frequency, if the RCO uses more than one, based on the aircraft's proximate location to the RCO. The pilot typically locates the aircraft on a map, which has the various RCOs in the location of aircraft and their generalized transceiver ranges delineated. In many instances, the transceiver range may be illustrated as a radius around the RCO. As described above, the range circles are typically general in nature. For example, the ranges typically do not account for the height of the aircraft and local terrain conditions that may affect the transceiver range. As discussed above, if the RCO is not operational, is out of range, is blocked by the terrain, or is busy, acknowledgement of the attempted handoff may be delayed or may not happen at all.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure herein, a communication frequency coverage prediction system for an aircraft is provided. The communication frequency coverage prediction system may include a memory for storing a program containing computer-executable instructions for determining communication frequency coverages. The communication frequency coverage prediction system may also include a processing unit functionally coupled to the memory and the display unit. The processing unit may be responsive to the computer-executable instructions and may be configured to access a remote communication outlet data store to retrieve remote communication outlet records. The remote communication outlet records may include a record of a plurality of remote communication outlets and at least one communication frequency record associated with the plurality of remote communication outlets. The processing unit may also be configured prioritize at least one of one or more remote communication outlets within transmission range of the aircraft.

According to another aspect, a computer-readable storage medium having computer-executable instructions is provided. The computer-executable instructions, when executed by the computer, cause the computer to access a remote communication outlet data store to retrieve remote communication outlet records. The remote communication outlet records may include a record of a first remote communication outlet and a record of a second remote communication outlet. The remote communication outlet records may further include at least one communication frequency record associated with the first remote communication outlet and at least one communication frequency record associated with the second remote communication outlet. The computer-executable instructions may further include instructions to calculate a first range ring for the first remote communication outlet and a second range ring for the second remote communication outlet and highlight the first range ring if the aircraft is within the first range ring and highlight the second range ring if the aircraft is within the second range ring.

According to yet another aspect, a method for displaying communication frequency coverage for an aircraft is provided. The method may include receiving an input to determine a remote communication outlet frequency to which to tune a radio and accessing a remote communication outlet data store to retrieve a communication outlet record. The remote communication outlet record may include a record of a remote communication outlet and a plurality of communication frequency records associated with the remote communication outlet. The method may further include calculating a range ring for the remote communication outlet and determining whether a time of operations for the remote communication outlet is valid. If the time of operations for the remote communication outlet is valid, the method may also include determining if the aircraft is within the range ring. If the aircraft is within the range ring, the method may further include determining a priority of the plurality of communication frequency records and displaying the plurality of communication frequency records in order of the priority.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
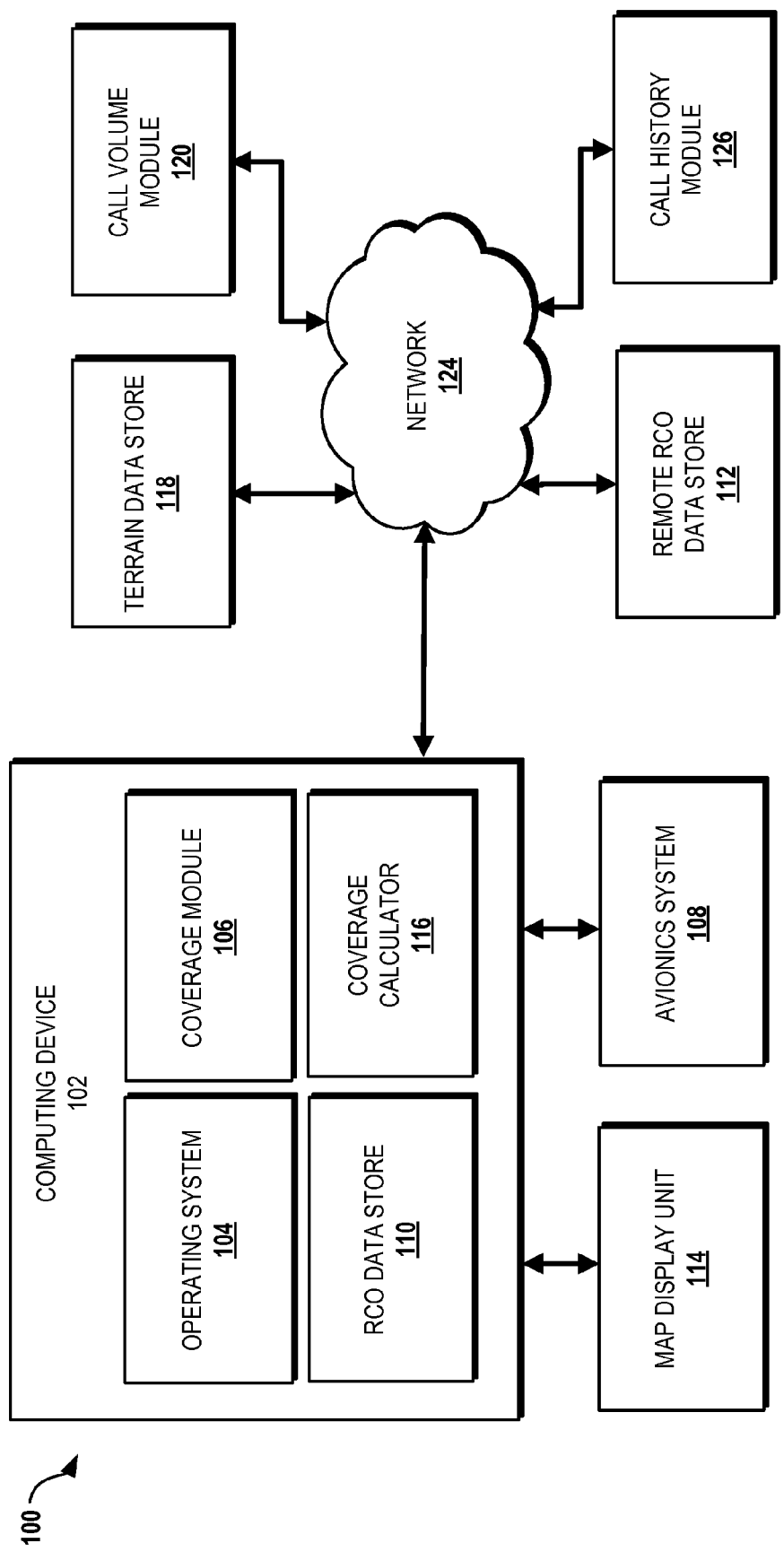
FIG. 1 is a block diagram illustrating various aspects of a frequency coverage system for an aircraft, according to embodiments presented herein.

The following detailed description is directed to methods, systems, and computer-readable media for a communication frequency coverage system. Various aspects of the disclosure provided herein may determine one or more RCOs providing coverage for a location during the operation of an aircraft. In further implementations, various aspects of the disclosure provided herein may prioritize one or more RCOs within transmission range of an aircraft. Implementations of the disclosure provided herein may provide a graphical illustration of RCOs or ARTCC communication frequencies. In some implementations, the technology disclosed herein may provide a prioritized display of RCOs or ARTCC communication frequencies based on a prioritization of one or more RCOs. The prioritized display may include one or more range rings or a textual list of RCOs or ARTCC communication frequencies. In some configurations, the range rings or the textual list may be prioritized based on a relevance of the RCO or an order based on a reception of the RCOs.

During flight operations, an aircraft may depart a coverage area provided by an RCO. As described briefly above, in order to maintain communication with an ARTCC, or other controlled airspace, a pilot may need to switch frequencies to another RCO prior to losing coverage by the current RCO, which is commonly referred to as a handoff. Typically, the pilot will review a chart and determine a communication frequency of an RCO providing coverage for the location of the aircraft. The pilot will switch the radio transceiver communication frequency of the aircraft to the new communication frequency and provide details regarding the aircraft. The pilot may receive input that the handoff was successful by receiving an acknowledgment from the ARTCC on the new communication frequency.

In some instances, the pilot may not know that the handoff occurred successfully. For example, the new communication frequency may have heavy call volume. In this instance, the pilot may not receive an acknowledgement within an expected amount of time and may erroneously determine that the handoff was unsuccessful. In other instances, the aircraft may be at a location and altitude that does not permit the RCO transmissions to be received at the aircraft or the aircraft transmissions to be received at the RCO. For example, an RCO coverage area may be based on a theoretical calculation of the RCO, whereas the effects of terrain, weather, or other signal strength reducing effects can reduce the RCO coverage area. Thus, the pilot may be attempting to use an RCO, not knowing that the RCO coverage area is reduced because of flight conditions.

Various implementations described herein may help to reduce the probability that a handoff does not occur. In addition, various implementations described herein can present a user with information to more efficiently and effectively facilitate the handoff. As described in more detail below, concepts and technologies are provided herein that can highlight an RCO communication range ring to provide a user with information regarding an RCO or a communication frequency of an RCO. Various embodiments described herein also change an RCO communication range ring based on flight conditions.

Throughout this disclosure, embodiments may be described with respect to an RCO. However, it should be understood that the concepts presented herein are equally applicable to other types of communication systems, such as a remote transmitter/receiver (RTR) or any other system which an airborne vehicle has a choice of several possible communication stations. In addition, the disclosure herein may be described with respect to an ARTCC or ATC. However, it should be understood that, unless specifically limited, the concepts and technologies described herein may be applicable to either. Further, any acronyms used herein are not to be construed as limiting the disclosure to systems that use the acronyms in the ordinary course of operation. For example, an ARTCC may be known as an area control center (ACC) in various countries. Further, the designation of one or more operational units, such an ARTCC, is for illustrative purposes only and is not an intent to limit the scope of the disclosure. For example, in some countries, an ATC may provide, at least in part, the functionality of an ARTCC. Additionally, some descriptions may use the term "pilot" as a party utilizing various technologies described herein. However, the technologies described herein are not limited to a pilot, as other users such as a navigator, or systems, may utilize the technologies disclosed herein.

While the subject matter described herein may be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show by way of illustration specific embodiments or examples. In referring to the drawings, like numerals represent like elements throughout the several figures.

FIG. 1 shows various aspects of an illustrative system 100 for providing RCO communication frequency coverage information, according to embodiments. In some configurations, the system 100 may be configured to provide a prediction of communication frequency coverage in a given area by using various data. The system 100 includes a computing device 102 executing an operating system 104. The computing device 102 and its various components may be implemented as software, hardware, or a combination of the two. The computing device 102 may be part of a flight management computer, a flight management system, or other avionic system of an aircraft. Additionally, various embodiments of the computing device 102 may be implemented as a standalone computer not specifically designed for use within an aircraft, such as a tablet computer or laptop.

The computing device 102 is executing an operating system 104. The operating system 104 is an executable program for controlling various functions on the computing device 102. The computing device 102 is also executing a coverage module 106. The coverage module 106 receives an input from a user to determine an RCO coverage area based on the location of the aircraft. For example, a pilot may be near the outer edge of a coverage area of an RCO. The pilot may want to determine, using the coverage module 106, a new communication frequency for a new RCO to handoff communication from the current RCO. The pilot, or other entity or system, may provide an input to the coverage module 106 to determine one or more RCOs that may provide communication frequency coverage based on the location of the aircraft or flight conditions of the aircraft. In some implementations, the input to the coverage module 106 is not provided by a user, but rather, by a system. The disclosure provided herein is not limited to any particular input source.

To provide information regarding one or more RCOs that may be providing coverage for the aircraft, the coverage module 106 may need information regarding the location of the aircraft and RCOs in the general location of the aircraft. The coverage module 106 may receive information regarding the location of the aircraft from various sources. For example, the coverage module 106 may request location information from an avionics system 108 onboard the aircraft. The avionics system 108 may retrieve location information using tools such as global positioning or radio navigation aids. The avionics system 108 can determine the location of the aircraft and provide that information to the coverage module 106. In some configurations, the coverage module 106 can receive location information from another input source, such as from a pilot or navigator. The pilot or navigator may receive location information from an ATC based on a radar system used by the ATC. The pilot or navigator can input the information received from the ATC into the coverage module 106. The concepts described herein are not limited to any particular source of location information.

To determine the RCOs covering the area in which the aircraft is located, the coverage module 106 may request RCO coverage data using location information provided by, for example, the avionics system 108. If the RCO coverage data is stored onboard, the coverage module 106 may communicate with an RCO data store 110. The RCO data store 110 may have stored therein RCO coverage data for one or more locations. For example, prior to commencing the flight, the pilot, or other entity, may load RCO coverage data into the RCO data store 110. For example, the pilot may retrieve data from a data source and direct that that information be stored in the RCO data store 110. In another example, the pilot may have data stored on a disc or other storage medium and transfer that data to the RCO data store 110. In that manner, the RCO coverage data may be retrieved without the need to communicate with a system outside of the aircraft.

In another implementation, the coverage module 106 may communicate with a remote RCO data store 112 using a network 124. In some configurations, the network 124 can include the Internet, an intranet, or an extranet, or various combinations thereof. It should be appreciated that the network 124 is illustrated as a single network. However, the network 124 may be a different communication pathway from one function to another depending on the particular function. An aircraft may have the capability to communicate with systems outside of the aircraft using satellite or ground based Internet connectivity systems. In those instances, a computer system in the aircraft may be able to transmit and receive data, such as RCO coverage data, from the remote RCO data store 112 using the Internet connection provided by the network 124.

When the RCO coverage data is received at the coverage module, the coverage module 106 can provide that information to the pilot in various ways. For example, the coverage module 106 may provide the RCO coverage data in a display on a map display unit 114 (described by way of example in FIG. 2, below). The map display unit 114 can be a display screen, a printout, or other display mechanism. The presently disclosed subject matter is not limited to any particular display technology for the map display unit 114.

As discussed briefly above, the RCO coverage data provided by the RCO data store 110 or the remote RCO data store 112 may need to be adjusted for current flight conditions. A reason for this may be that the RCO coverage data is a theoretical calculation of radio transmission ranges based on the transceiver power of the RCO. But, various flight conditions may affect the RCO coverage data, requiring the adjustment of the RCO coverage data. If not done, in some instances, a pilot may be under the impression that a particular RCO can be used, where in fact, because of various flight conditions, it cannot.

To account for this, in some implementations, the coverage module 106 may adjust the RCO coverage data for flight conditions using a coverage calculator 116. The coverage calculator 116 can increase or decrease the theoretical or expected size of the RCO coverage, typically illustrated as a range ring with a radius around the RCO. The coverage calculator 116 can adjust the radius of the range ring using various flight conditions. In one implementation, the coverage calculator 116 can adjust the radius of the RCO range ring based on factors such as the altitude of the aircraft, variance in transmission power, atmospheric conditions in the vicinity of the RCO, and others. Further, depending the particular implementation, the coverage calculator 116 may provide an additional adjustment to determine a more conservative estimate of the range ring. An exemplary calculation for adjusting the radius of the ring is shown below:

$$\text{RADIUS} = k * (\sqrt{H^{aircraft}} + \sqrt{H^{groundstation}}),$$

where RADIUS is the radius of the range ring, $H^{aircraft}$ is the altitude of the aircraft, and $H^{groundstation}$ is the elevation of the ground station above sea level. A factor $k$ can be used to compensate for various factors affecting a signal including, but not limited to, transmission signal strength, altitude of the aircraft, variance in transmission power, atmospheric conditions, ground effects on the signal, and interference with other transmission sources. In some implementations a factor of k=1.2 can be used, but it should be understood that the concepts described herein are not limited to any particular value of k.

Even though the aircraft may be within the range ring calculated by the coverage calculator 116, either with or without the adjustment described above, the terrain between the RCO and the aircraft may affect communications. In some implementations, a line of sight calculation and comparison may be performed to determine terrain effects. To account for terrain, terrain data may be retrieved from a data store such as a terrain data store 118. The terrain data store 118 may store detailed information relating to a particular location surrounding various RCOs. The terrain data store 118 can store information such as tree lines, obstructions, effects of weather, and other factors that may cause the terrain to affect the ability to communicate with an RCO.

There are several ways in which terrain effects may be calculated. For example, the angles from the following formulas may be compared to each other to determine if a signal may be blocked by the terrain. A line of sight interruption caused by terrain in direct line to the aircraft may be determined by comparing $$\text{Tan}^{-1}((H^{aircraft} - H^{groundstation})/D^{aircraft\text{-}groundstation}))$$

to $$\text{Tan}^{-1}((H^{aircraft} - H^{terrain})/D^{aircraft\text{-}terrain})),$$

where $H^{aircraft}$ is the altitude of the aircraft in feet, $H^{groundstation}$ is the elevation of the ground station above sea level in feet, $D^{aircraft\text{-}groundstation}$ is the distance between the aircraft and the groundstation in feet, and $D^{aircraft\text{-}terrain}$ is the distance between the aircraft and the terrain in feet.

If the angle from the first equation immediately above is greater than the angle from the second equation immediately above, than the signal from the RCO may be blocked by the terrain. In that instance, if the RCO signal is likely blocked, the coverage calculator 116 may exclude the RCO as a possible RCO for communication. It should be understood that the radius of the RCO range ring may be adjusted using various equations and factors. Further, the effects of terrain may be accounted for using different techniques than that described above. The disclosure presented herein is not limited to any particular radius adjustment or terrain effect compensation technique.

There may be other techniques for determining which RCO to use. In one example, an RCO may transmit in the high frequency (HF) band at radio frequencies between 3 and 30 MHz. In this communication frequency range, the primary means of transmitting over long distances is skywave propagation, or skipping. In skywave propagation, the radio waves are directed at the sky at particular angles and are refracted back to Earth in the ionosphere. Using this method, HF radio waves can travel around the curvature of the earth and beyond the horizon. The use of skywave propagation is dependent on several factors, including weather conditions, ionosphere conditions, solar activity, and others. The coverage module 106, if so configured, may also receive and use information regarding RCOs transmitting at HF frequencies.

In some implementations, there may be reasons to prioritize the RCOs. For example, an RCO that the coverage calculator 116 has determined to be acceptable may be actually unacceptable because of a high volume of traffic on the RCO. In a scenario discussed above, a pilot may erroneously determine that he or she is not in communication through an RCO because of the delay in receiving an acknowledgment from the ARTCC. It may be beneficial for the pilot to use another RCO or another communication frequency of the RCO (if the RCO has multiple frequencies) based on the call volume of the RCO or a particular communication frequency of the RCO. In a further configuration, the prioritization of the RCOs may be based on a relevance of the RCOs. For example, RCOs near the aircraft may be the most relevant compared to RCOs further away. In another configuration, the prioritization may be a list of descending order of RCOs having the best reception level to RCOs having the worst reception levels. In another configuration, an RCO with a weaker signal may be top priority crossing a boundary into an area serviced by a different traffic control center where the strongest signal is still from the prior control region.

To facilitate call volume data, system 100 can also include a call volume module 120, which has stored therein one or more call volume records for one or more RCOs. The coverage module 106 can access the call volume module 120 to retrieve information about the call volume on one or more RCOs or frequencies. The call volume module 120 can be provided by various sources, including an RCO or ARTCC. In one implementation, the call volume module 120 can provide data to the coverage module 106 regarding the amount of traffic on various frequencies associated with one or more RCOs. Although not limited to any particular data, the call volume module 120 data be an indication of the current call volume or may be an indicator showing relative call volume, such as low, medium or high.

The coverage module 106 can receive the call volume data and adjust the RCO display in the map display unit 114 to provide additional information to the pilot. In one example, the coverage module 106 may cause the range ring of RCOs or frequencies with a high volume of traffic to be displayed in a different color than other RCOs or frequencies having lower traffic volume. For instance, high volume RCOs may be range rings displayed in red, signifying a usable RCO but one that has a higher call volume when compared to other RCOs. The pilot, or other entity, can review the information and determine if another RCO or communication frequency is a more suitable choice.

In some configurations, the current call volume may not be available or accessible. This may occur because of the data and bandwidth requirements that may be needed to facilitate accurate, up-to-date and current call volume. In some configurations, the system 100 may include a call history module 126. The call history module 126 can be a data store that stores a historical record of call volumes for various RCOs or frequencies. Thus, if the call volume module 120 is inaccessible or otherwise unavailable, the pilot, or other entity, may still be able to review information regarding possible call volume on a particular RCO or communication frequency.

For example, an RCO communication frequency may have a history of heavy use. Despite not having the current volume data, a pilot may still want to know that there is a good chance the RCO is being heavily used, and may want to use another RCO or communication frequency with a lower call volume history. RCOs with a history of high volume may have their range rings presented in a color to indicate the high volume, such as red. The pilot can review the data and determine if another RCO within range is a better choice because of a lower historical call volume.

The system 100 may also be configured to prioritize RCO information for the pilot. As discussed above, various flight conditions, such as the terrain, as well as various RCO conditions, such as call volume or operational status, may eliminate or reduce the usefulness of an RCO. Other prioritization factors may include the distance from the aircraft to a particular RCO, the altitude of the aircraft, and the like. The system may be configured to prioritize RCOs in a list or in a display. The RCOs may be prioritized based on various factors and for various reasons. For example, the RCOs may be listed with the closest RCO at the top and the furthest RCO at the bottom. In another example, the RCOs may be listed with the RCO having the lowest call volume at the top and the RCO with the highest call volume at the bottom. The disclosure provided herein is not limited to any particular factor or reason for prioritizing the RCOs or their frequencies.

Figure 2:
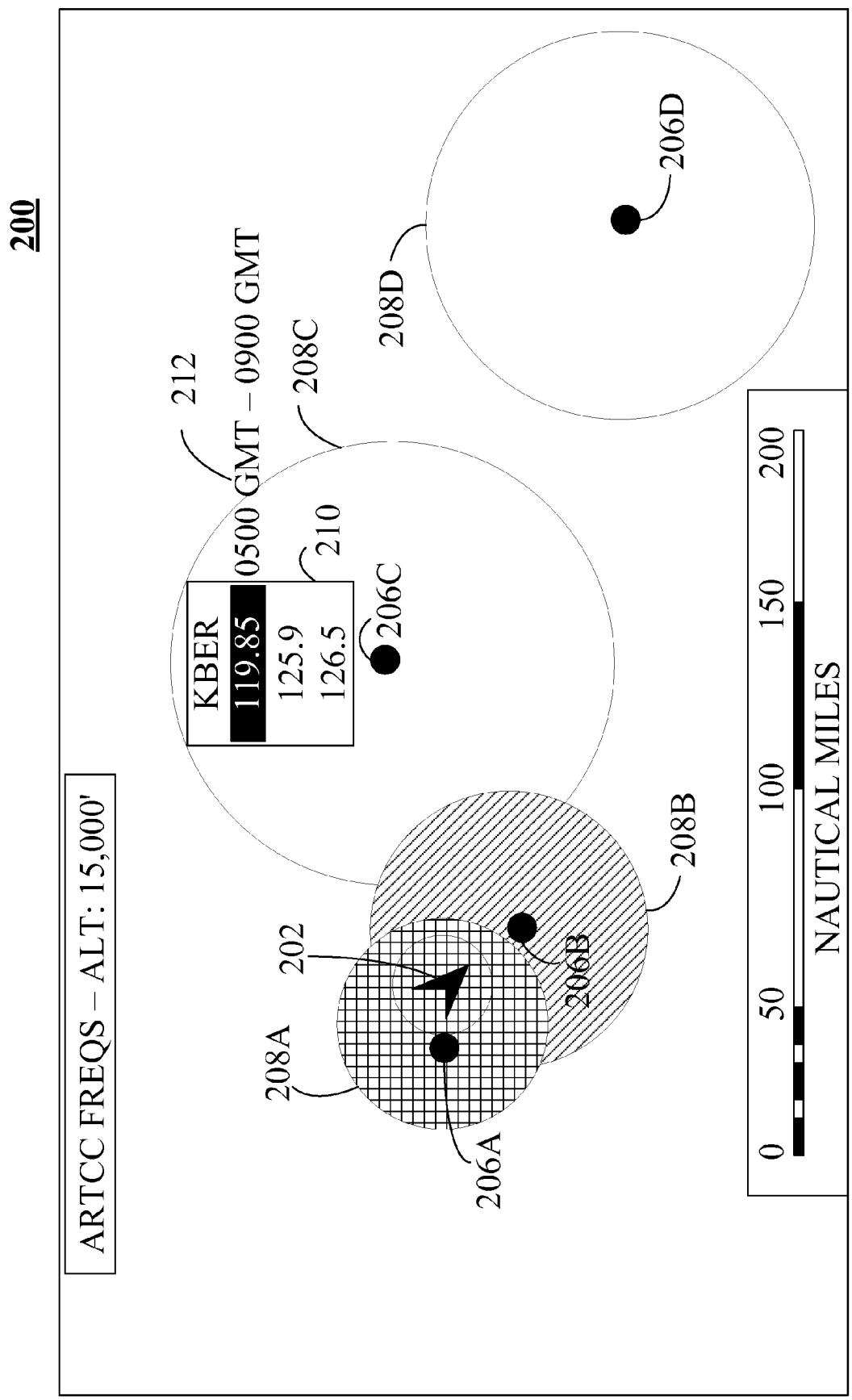
FIG. 2 is an illustration of a chart showing calculated range rings of a frequency coverage system for an aircraft, according to embodiments presented herein.

FIG. 2 illustrates a map 200 showing prioritized RCO communication frequency coverage. The map 200 may be displayed on various display devices, including the map display unit 114 of FIG. 1. The map 200 shows an aircraft 202 in the vicinity of RCOs 206A-206D. The RCOs 206A-206D are transceiver stations used by pilots to communicate with ATC or ARTCC. The RCOs 206A-206D extend the communication range of ATC or ARTCC. The RCOs 206A-206D are illustrated with their RCO range rings, 208A-208D respectively. The radius of the RCO range rings 208A-208D may be provide by several sources, including the coverage calculator 116 of FIG. 1.

As illustrated in FIG. 2, the aircraft 202 is located within range rings 208A and 208B, corresponding to the RCO 206A and RCO 206B, respectively. In some implementations, the pilot may decide which RCO to use based on this information alone. But, as discussed earlier, additional information may be provided to the pilot, including a prioritization of the RCOs in communication range. This may help the pilot may a more informed decision as to which RCO or communication frequency to which to tune. RCO 206A is shown with a cross hatch pattern, while RCO 206B is shown with a dashed line pattern.

Depending on the particular configuration, RCOs with a cross hatch pattern may indicate that the RCOs with the cross hatch pattern are a higher priority than RCOs with a dashed line pattern. There may be several reasons why the RCO 206A is indicated as a higher priority. For example, the line of sight calculation may have determined that the RCO 206A is a better choice for communication than the RCO 206B. In another example, the RCO 206A may have a lower call volume than the RCO 206B. Based on the information provided, the pilot may choose to use the RCO 206A instead of the RCO 206B. In addition, the dashed line pattern may be an unavailable indicator that informs the pilot that the RCO 206B is unavailable. With regard to the RCO 206C and 206D, because their range rings are shown outside of the location of the aircraft 202, the pilot may not choose the RCO 206C or the RCO 206D.

Some RCOs, such as the RCO 206C, can transmit and receive using multiple frequencies. Along with prioritizing RCOs, the frequencies associated with a particular RCO may be prioritized or otherwise delineated in some fashion to show additional data. The frequencies can be displayed in a communication frequency list, such as a frequency list 210 associated with RCO 206C. In accordance with some implementations disclosed herein, the frequencies in the frequency list 210 may be prioritized or otherwise have an indication signifying a special status. For example, communication frequency 119.85 in the frequency list 210 is shown as being highlighted in black. This may signify that the communication frequency, which may otherwise be a higher priority communication frequency, is unavailable for use. In that instance, the time of operations 212 may be illustrated next to the communication frequency to show when the communication frequency may be used.

Figure 3:
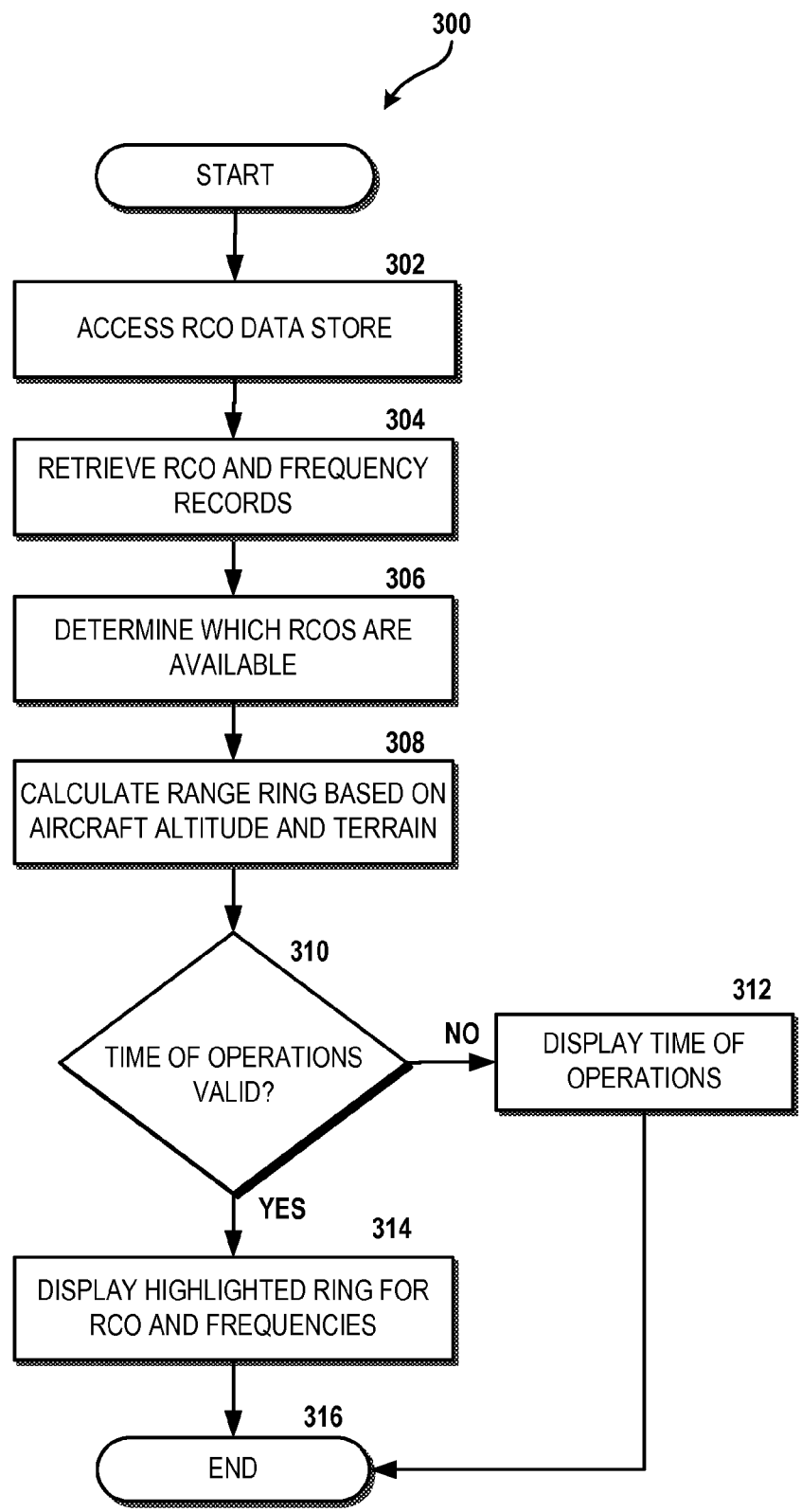
FIG. 3 is an exemplary method for providing a frequency coverage system, according to embodiments presented herein.

Turning now to FIG. 3, additional details will be provided regarding embodiments presented herein for providing communication coverage. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 3 shows a routine 300 for providing RCO communication coverage for the pilot of an aircraft 202. In one embodiment, the routine 300 is performed by the computing device 102 described above in regard to FIG. 1. It will be appreciated that the routine 300 may also be performed by another module or component, performed in part by multiple modules or components or other systems. The routine 300 starts at routine 300 and proceeds to operation 302, where the coverage module 106 accesses the RCO data store 110. The coverage module 106 may access the RCO data store 110 based on an input from the pilot to cause the computing device 102 map display unit 114 to show RCOs to which the pilot may tune a radio. As discussed above, a pilot may need to move from one RCO to another RCO while moving along a flight path. The RCO to which the pilot is tuned may not provide communication coverage for the location of the aircraft 202. Before leaving the coverage area of one RCO, the pilot may want to tune to another RCO in a handoff procedure. By checking into the new RCO prior to moving out of the coverage area of the current RCO, if the handoff is unsuccessful, the pilot can tune back to the current RCO and try to find another RCO.

The routine 300 proceeds from operation 302 to operation 304, where RCO records and communication frequency records are retrieved. The records may also include one or more maps upon which RCO range rings relative to the position of the aircraft may be displayed. The RCO records may be retrieved from various sources. For example, RCO records may be retrieved from the RCO data store 110 located on the aircraft 202. If the aircraft 202 is in communication with an outside system through network 124, the RCO records may be retrieved from the remote RCO data store 112.

The routine 300 proceeds from operation 304 to operation 306, where a determination is made as to which RCOs are available. In one implementation, the RCOs that are available are RCOs in transmission range of the aircraft 202. The routine proceeds from operation 306 to operation 308, where the range ring is calculated. Although not limited to any particular implementation, an exemplary embodiment may make a determination by locating RCOs within the vicinity of the location of the aircraft 202. Data regarding the RCO is used to determine a range ring for each RCO. Once the range ring is determined, the radius of the range ring for the particular RCO may be adjusted based on flight conditions and other factors. The effects of terrain may be accounted for in the adjustment of the range ring.

Although an RCO may be calculated as being available for use, the RCO may not actually be operational. Therefore, in one implementation, the routine proceeds from operation 308 to operation 310, where a determination is made as to whether or not the available RCOs have a valid time of operations. In one example, a valid time of operations means that the RCO is schedule for operation at the particular time of use. In another example, the RCO may be down for maintenance. If the time of operations are not valid, the routine proceeds from operation 310 to operation 312, where a time of operations 212 is displayed. It should be appreciated that operation 310 may be performed prior to, or in conjunction with, other operations, such as operation 306. From operation 312, the routine 300 ends at operation 316.

The routine 300 continues from operation 310 to operation 314, the range rings and frequencies are displayed and highlighted. As discussed above, the concepts described herein do not require that the range rings be highlighted, or if so, highlighted in any particular manner. The range rings may be highlighted to show a prioritization applied to the range rings, to show call volume, or to show call history, among others. Routine 300 continues from operation 314 and ends at operation 316.

Figure 4:
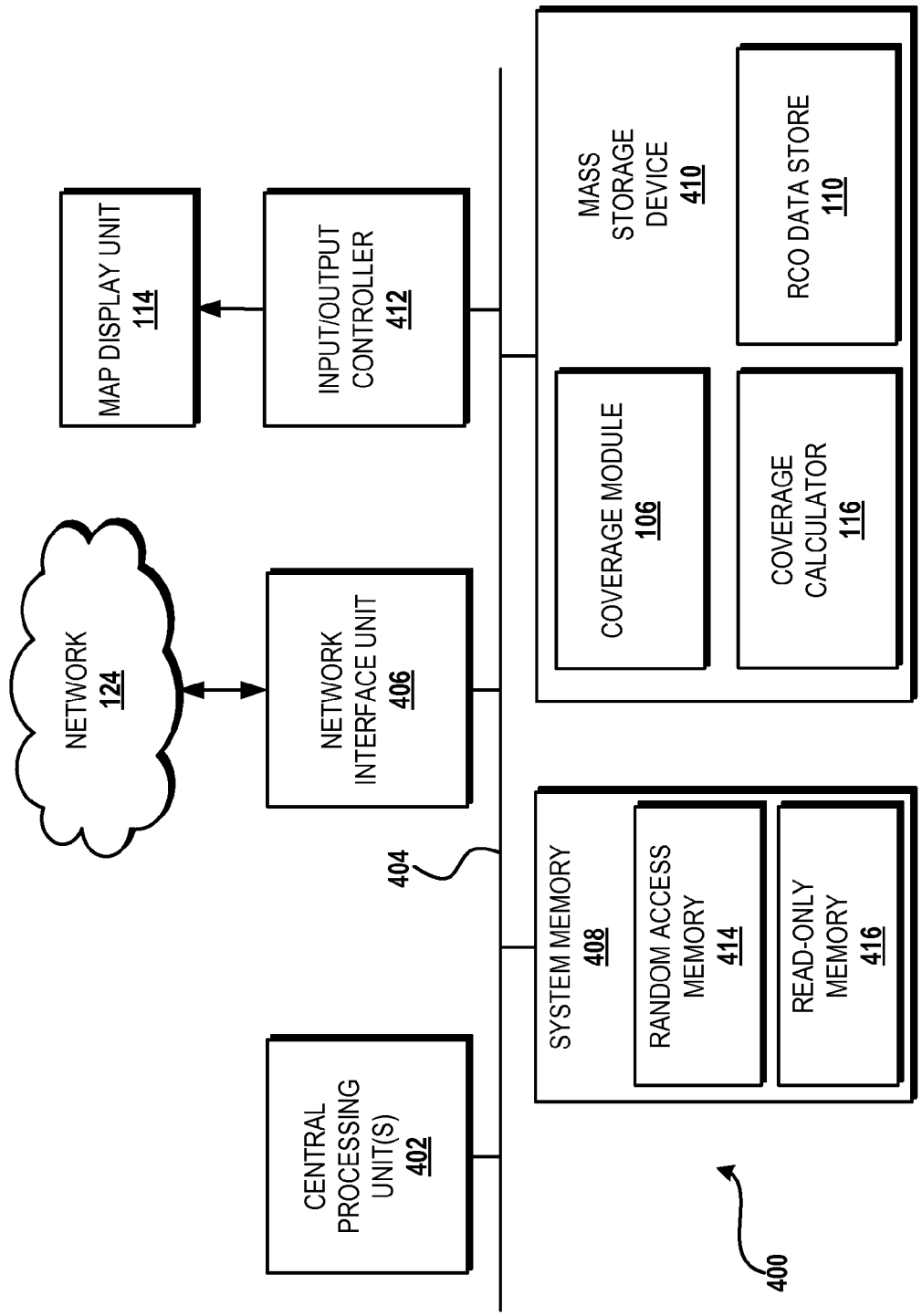
FIG. 4 is a block diagram showing an illustrative computer system capable of implementing aspects of the embodiments presented herein.

FIG. 4 shows an illustrative computer system 400 capable of executing the software components described herein for providing communication coverage, in the manner presented above, by way of example, the computing device 102 of FIG. 1. The computer system 400 may be embodied in single computing device or in a combination of one or more processing units, storage units, and/or other computing devices implemented in various systems of the aircraft. The computer system 400 includes one or more central processing units 402 ("CPUs"), a system memory 408, including a random access memory 414 ("RAM") and a read-only memory 416 ("ROM"), and a system bus 404 that couples the memory to the CPUs 402.

The CPUs 402 may be standard programmable processors that perform arithmetic and logical operations for the operation of the computer system 400. The CPUs 402 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer system 400 also includes a mass storage device 410. The mass storage device 410 may be connected to the CPUs 402 through a mass storage controller (not shown) further connected to the bus 404. The mass storage device 410 and its associated computer-readable media provide non-volatile storage for the computer system 400. The mass storage device 410 may store various software modules and components, as well as specific application modules or other program modules, such as the coverage module 106, the coverage calculator 116 or the RCO data store 110 described above in regard to FIG. 1.

The computer system 400 may store programs and data on the mass storage device 410 by transforming the physical state of the mass storage device to reflect the information being stored. The specific transformation of physical state may depend on various factors, in different implementations of this disclosure. Examples of such factors may include, but are not limited to, the technology used to implement the mass storage device 410, whether the mass storage device is characterized as primary or secondary storage, and the like.

For example, the computer system 400 may store information to the mass storage device 410 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer system 400 may further read information from the mass storage device 410 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer system 400. Computer-readable media includes communication media, such as transitory signals, and computer-readable storage media. Computer-readable storage media includes volatile and non-volatile, removable and non-removable media implemented in any method or technology for the non-transitory storage of information such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information in a non-transitory fashion and that can be accessed by the computer system 400. According to one embodiment, the computer system 400 may have access to computer-readable storage media storing computer-executable instructions that, when executed by the computer, perform the routine 300 for providing RCO coverage information, as described above in regard to FIG. 3.

According to various embodiments, the computer system 400 may operate in a networked environment using logical connections to other avionics in the aircraft through a network, such as the network 124. The computer system 400 may connect to the network 124 through a network interface unit 406 connected to the bus 404. It should be appreciated that the network interface unit 406 may also be utilized to connect to other types of networks and remote computer systems. The computer system 400 may also include an input-output controller 412 for receiving input and providing output to aircraft terminals and displays, such as the map display unit 114 described above in regard to FIG. 1. The input-output controller 412 may receive input from other devices as well, including an MCDU, an EFIS control panel, a DSP, a keyboard, mouse, electronic stylus, or touch screen associated with the map display unit 114. Similarly, the input-output controller 412 may provide output to other displays, a printer, or other type of output device. It will be further appreciated that the computer system 400 may not include all of the components shown in FIG. 4, may include other components that are not explicitly shown in FIG. 4, or may utilize an architecture completely different than that shown in FIG. 4.

Based on the foregoing, it should be appreciated that technologies for providing communication coverage information are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A communication frequency coverage prediction system for an aircraft, the system comprising:
  a memory for storing a program containing computer-executable instructions for determining communication frequency coverage; and
  a processing unit functionally coupled to the memory, the processing unit being responsive to the computer-executable instructions and configured to:
    access a remote communication outlet data store to retrieve remote communication outlet records, the remote communication outlet records comprising a record of a plurality of remote communication outlets and at least one communication frequency record associated with each of the plurality of remote communication outlets; and
    prioritize at least one of the plurality of remote communication outlets within transmission range of the aircraft, wherein prioritizing the at least one of the plurality of remote communication outlets comprises (i) calculating a range ring for a first remote communication outlet of the plurality of remote communication outlets and, (ii) upon determining the aircraft is within the range ring of the first remote communication outlet of the plurality of remote communications outlets, provide the range ring for the first remote communication outlet and the at least one communication frequency record associated with the first remote communication outlet of the plurality of remote communications outlets.

2. The communication frequency coverage prediction system of claim 1, wherein the computer-executable instructions to calculate the range ring for the first remote communication outlet of the plurality of remote communications outlets comprises instructions to determine whether a time of operations for the first remote communication outlet of the plurality of remote communications outlets is valid.

3. The communication frequency coverage prediction system of claim 2, wherein if the time of operations for the first remote communications of the plurality of remote communications outlets outlet is invalid, the computer-executable instructions further comprise instructions to display a time of operations for the first remote communication outlet of the plurality of remote communications outlets.

4. The communication frequency coverage prediction system of claim 1, wherein the computer-executable instructions to provide the range ring for the first remote communication outlet of the plurality of remote communications outlets further comprises instructions to reduce the radius of the range ring based on a line of sight variance.

5. The communication frequency coverage prediction system of claim 4, wherein the line of sight variance is computed based on an altitude of the aircraft and an altitude of a terrain between the aircraft and the first remote communication outlet.

6. A communication frequency coverage prediction system for an aircraft, the system comprising:
  a memory for storing a program containing computer-executable instructions for determining communication frequency coverages; and
  a processing unit functionally coupled to the memory, the processing unit being responsive to the computer-executable instructions and configured to:
    access a remote communication outlet data store to retrieve remote communication outlet records, the remote communication outlet records comprising a record of a plurality of remote communication outlets and at least one communication frequency record associated with each of the plurality of remote communication outlets; and
  prioritize at least one of the plurality of remote communication outlets within transmission range of the aircraft by determining a transmitting range of the least one of the plurality of remote communications outlets based on the height of the aircraft and local terrain conditions.

7. The communication frequency coverage prediction system of claim 1, wherein the computer-executable instructions to prioritize at least one of the plurality of remote communication outlets within transmission range of the aircraft comprises determining a relevance of the at least one of the plurality of remote communications outlets.

8. The communication frequency coverage prediction system of claim 7, wherein determining the relevance of at least one of the plurality of remote communications outlets comprises determining a best reception level for the at least one of the plurality of remote communication outlets.

9. The communication frequency coverage prediction system of claim 1, wherein the computer-executable instructions further comprise providing a prioritized list comprising the at least one of the plurality of remote communication outlets.

10. The communication frequency coverage prediction system of claim 9, wherein the prioritized list is based on a relevance of the plurality of remote communication outlets.

11. The communication frequency coverage prediction system of claim 9, wherein the prioritized list is based on a reception level of the plurality of remote communication outlets.

12. A non-transitory computer-readable storage medium comprising computer-executable instructions that, when executed by a computer, cause the computer to:
  access a remote communication outlet data store to retrieve remote communication outlet records comprising a record of a first remote communication outlet, a record of a second remote communication outlet, at least one communication frequency record associated with the first remote communication outlet, and at least one communication frequency record associated with the second remote communication outlet;
  calculate a first range ring for the first remote communication outlet and a second range ring for the second remote communication outlet;
  upon determining the aircraft is within the first range ring, prioritize the first range ring and provide the first range ring and the at least one communication frequency record associated with the first remote communication outlet; and
  upon determining the aircraft is within the second range ring, prioritize the second range ring and provide the second range ring and the at least one communication frequency record associated with the second remote communication outlet.

13. The computer-readable storage medium of claim 12, further comprising computer-executable instructions to:
   determine whether a time of operations for the first remote communication outlet and the second remote communication outlet is valid; and
   if the time of operations for the first remote communication outlet or the second remote communication outlet is not valid, display a time of operations for the first remote communication outlet if the time of operations for the first remote communication outlet is invalid or display a time of operations for the second remote communication outlet if the time of operations for the second remote communication outlet is invalid.

14. The computer-readable storage medium of claim 12, wherein the computer-executable instructions to calculate a first range ring for the first remote communication outlet comprises computer-executable instructions to determine a transmission range of the first remote communication outlet based on an altitude of the aircraft, a variance in transmission power of the first remote communication outlet, or atmospheric conditions in the vicinity of the first remote communication outlet.

15. The computer-readable storage medium of claim 14, wherein the computer-executable instructions to determine the transmission range of the first remote communication outlet further comprises instructions to reduce the radius of the first range ring based on a line of sight variance to the first remote communication outlet.

16. The computer-readable storage medium of claim 15, wherein the line of sight variance to the first remote communication outlet is computed based on an altitude of the aircraft and a terrain between the aircraft and the first remote communication outlet.

17. The computer-readable storage medium of claim 12, wherein the computer-executable instructions further comprise instructions to determine a priority of the first remote communication outlet in relation to the second remote communication outlet.

18. The computer-readable storage medium of claim 17, wherein the instructions to determine a priority of the first remote communication outlet in relation to the second remote communication outlet comprises instructions to;
   retrieve a call volume record for the first remote communication outlet and the second remote communication outlet, and
   prioritize the first remote communication outlet over the second remote communication outlet if the first remote communication outlet has a higher call volume than the second remote communication outlet.

19. A method for displaying communication frequency coverage for an aircraft, the method comprising:
   receiving an input to determine a remote communication outlet frequency to which to tune a radio;
   accessing a remote communication outlet data store to retrieve a communication outlet record comprising a record of a remote communication outlet and a plurality of communication frequency records associated with the remote communication outlet;
   calculating a range ring for the remote communication outlet;
   determining whether a time of operations for the remote communication outlet is valid;
   if the time of operations for the remote communication outlet is valid, determining if the aircraft is within the range ring;
   displaying and highlighting the range ring if the aircraft is within the range ring;
   determining a priority of the plurality of communication frequency records; and
   displaying the plurality of communication frequency records in order of the priority.

\* \* \* \* \*